United States Patent Office 3,227,899
Patented Jan. 4, 1966

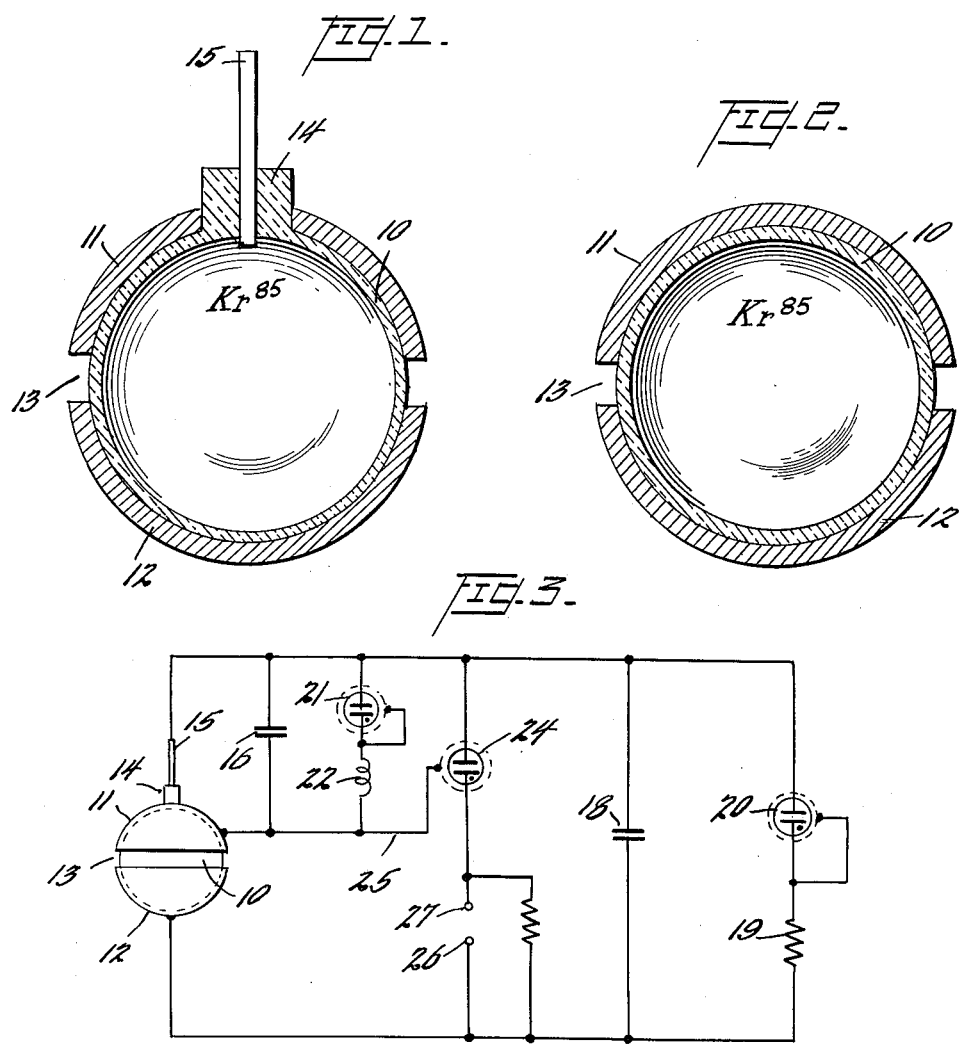

3,227,899
ALTITUDE RESPONSIVE DEVICE
Rene J. Perdreaux, Brooklyn, N.Y., assignor to Leesona Corporation, Cranston, R.I., a corporation of Massachusetts
Filed Sept. 7, 1960, Ser. No. 54,432
8 Claims. (Cl. 310—3)

This invention relates to altitude responsive devices and more particularly to an altitude responsive switching device.

In ballistic missiles, it is desirable to provide some means for arming the warhead after the missile has reached a relatively high altitude. Arrangements such as this eliminate the possibility of explosion of the warhead during the early stages of the flight and hence are highly desirable for obvious reasons. In the past, it has been customary to provide circuits for arming the warhead or for locking out an arming circuit which utilize an acceleration responsive switch. The arming circuit remained unactuated or locked out until a predetermined change in the acceleration of the missile actuated the acceleration responsive switch which in turn permitted the arming circuit to operate and arm the warhead. However, in certain types of missiles the changes in acceleration are complete at a relatively low altitude and the missile then coasts upward along its trajectory. If the present type of lock-out circuit were to be utilized in missiles of this type, the arming of the warhead would take place at a lower altitude than is desirable. To avoid this situation, it would be highly desirable to utilize a switch which is responsive to changes in altitude rather than one which is responsive to changes in acceleration.

It is therefore a primary object of this invention to provide a new and improved altitude responsive device.

It is another object of this invention to provide a new and improved nuclear battery combined with an altitude responsive switching device.

It is another object of this invention to provide an altitude responsive switching device which may be combined with any suitable source of electrical power.

It is a further object of this invention to provide an altitude responsive switching device which comprises only elements already present in a nuclear battery.

It is yet another object of this invention to provide a lock-out or arming circuit utilizing a combined nuclear battery and altitude responsive switching device.

With these and other objects in view, the present invention contemplates a spherical ampoule, of electrically insulating material such as glass, containing a radioactive gas such as krypton 85. A pair of substantially hemispherical copper collector electrodes or cathodes are bonded to the exterior of the ampoule with edges thereof spaced apart to provide an air gap between the electrodes. An anode projects into the interior of the ampoule through one of the hemispherical electrodes or cathodes and the adjacent wall of the ampoule. The anode is electrically insulated from the hemispherical electrode through which it projects. The wall thickness of said ampoule is so selected that said ampoule is permeable to primary beta particles emitted by said radioactive gas while being impermeable to back scattered primaries and low energy secondaries.

Other objects, advantages and novel features of the invention will become readily apparent upon consideration of the following detailed description taken in conjunction with the accompanying drawings wherein:

FIGURE 1 is a full sectional view of a combined nuclear battery and altitude responsive switching device;

FIGURE 2 is a full sectional view of an altitude responsive switching device; and FIGURE 3 is a schematic diagram of a lock-out or arming circuit utilizing the combined nuclear battery and altitude responsive switching device of FIG. 1.

Referring now to the drawings wherein like numerals of reference designate like parts throughout the several views, and in particular to FIG. 1, one embodiment of the combined nuclear battery and altitude responsive switching device of the present invention comprises a spherical glass envelope or ampoule 10 containing a quantity of krypton 85, a radioactive gas. Other radioactive fluids would likewise be suitable, although it is preferable that they be non-toxic in nature. A pair of copper collector electrodes or cathodes 11 and 12, of substantially hemispherical configuration, are bonded to the exterior of the ampoule 10. The electrodes or cathodes 11 and 12 are spaced apart along an equator of the sphere 10 to provide an air gap 13, the function of which will be described later.

The ampoule 10 is provided with a boss 14 which projects through the center of the upper electrode 11. The boss 14 has an anode 15 fused therein and communicating with the interior of the ampoule 10. This configuration provides a nuclear battery with operation between electrode 11 and the anode 15 or between electrode 12 and the anode 15. Approximately the same amount of current is available from each of these combinations. If electrodes or cathodes 11 and 12 are connected electrically, twice the current is available. This configuration differs from conventional nuclear batteries in that they are customarily provided with a single collector electrode, i.e., the electrodes or cathodes 11 and 12 would be continuous rather than separated by the air gap 13. The air gap 13, in addition to providing two nuclear batteries from a single casing, performs a switching function which will be described later.

Referring now to FIG. 2, it can be seen that the altitude responsive switching device is identical with the combined nuclear battery and altitude responsive switching device of FIG. 1 with the exception of the omission of the boss 14 and anode 15. This configuration provides an altitude responsive switching device without the incorporation therein of the battery function. This device operates as follows. The air gap 13 between the electrodes or cathodes 11 and 12 is continuously irradiated by the krypton 85 and the air contained within the gap 13 is ionized. The electrodes 11 and 12 act as the switch contacts. The degree or amount of ionization controls the resistance across the gap and between the electrodes 11 and 12. At low altitudes where the air is more dense, the degree of ionization in the gap will be "high" and the switch will be "closed." At high altitudes where the density of the surrounding air is much lower, the degree of ionization will be "low" and the switch will be "open" due to an extremely high resistance between the electrodes 11 and 12. This configuration provides a switching device which will present a closed circuit condition when surrounded by dense low altitude air and a substantially open circuit condition when surrounded by the rarified air found at high altitudes.

Attention now is directed to FIG. 3 wherein is disclosed a lock-out or arming circuit utilizing the combined nuclear battery and altitude responsive switching device. In order that a thorough understanding of this circuit may be had, it will now be described in terms of its mode of operation. Since the rate of radioactive decay of any radioactive material is substantially constant for a given material throughout its half-life, the current output of a nuclear battery will likewise be substantially constant. The voltage of a nuclear battery is thus dependent upon the resistance of the external circuit. In the circuit of FIG. 3, a capacitor 16 is connected across the battery formed by the anode 15 and cathode 11 and a capacitor 18 is connected across the battery formed by the anode 15 and the cathode 12. To prevent the constant current feature inherent in the nuclear battery from overcharging the capacitors 16 and 18, a voltage regulator comprising a resistor 19 and a cold cathode gas diode 20 is provided. At sea level, the air in the gap 13 is highly ionized and thus the voltage regulator 19, 20 is effectively connected in parallel with each of the capacitors 16 and 18 since the ionized air in the gap 13 electrically connects the electrodes 11 and 12. Thus the electrodes 11 and 12 function as the contacts of an altitude responsive switching device as well as the negative terminals of the nuclear battery. The voltage regulator 19, 20 thus determines the battery voltage applied to the capacitors 16 and 18 and this regulated voltage may be predetermined by proper selection of the breakdown voltage of the diode 20.

As the missile carrying the circuit of FIG. 3 attains higher and higher altitudes, the density of the air gap 13 diminishes and the degree of ionization in the gap 13 is correspondingly reduced until the resistance across the gap 13 reaches such a magnitude that the voltage regulator 19, 20 is effectively disconnected from the capacitor 16. With the voltage regulator effectively disconnected from the battery formed by the anode 15 and the collector cathode 11, this battery will increase the charge on the capacitor 16 until the breakdown voltage of a cold cathode gas diode 21 is reached. When the diode 21 fires, the capacitor 16 is discharged through an inductance 22. The voltage appearing across the inductance 22 is applied to the shield of a cold cathode gas diode 24 by means of an interconnecting lead 25. This voltage pulse applied to the shield of the diode 24 causes it to fire and discharge the capacitor 18 through a load connected to load terminals 26 and 27. The breakdown voltages of the diodes 21 and 24 must, of course, be higher than the breakdown voltage of the diode 20 in order for the circuit to operate as described. The load connected across the terminal 27 can be either the arming circuit for the warhead of the missile or a relay device which locks out a separate arming circuit until the relay device is energized by the discharge of the capacitor 18.

Thus it can be seen that an improved nuclear battery has been devised which provides two nuclear battery circuits within a single housing and which is capable of performing a switching function in addition to the battery function. There has also been provided a switching device which will trigger a circuit at a predetermined altitude and which is completely independent of changes in acceleration of the vehicle carrying the circuit. It is, of course, obvious that the altitude responsive switching device of FIG. 2 has utility in its own right as an altitude responsive device and need not be combined with a nuclear battery.

It is to be understood that the above described embodiments are simply illustrative of the principal features of the invention. Numerous other arrangements could be readily devised by those skilled in the art which would embody the inventive concepts of the present invention and fall within the spirit and scope thereof.

What is claimed is:

1. A combined nuclear battery and altitude responsive switching device comprising an ampoule of electrically insulating material, a radioactive fluid which emits charged particles contained within said ampoule, said ampoule being permeable to said charged particles emitted by said radioactive fluid, a pair of collector electrodes substantially enclosing said ampoule and having interior configurations generally complementary to the exterior shape of said ampoule, the edges of said electrodes being spaced apart to provide an air gap therebetween, and an anode projecting through one of said electrodes and the adjacent wall of said ampoule and into the interior of said ampoule, said anode being electrically insulated from said one of said electrodes.

2. A combined nuclear battery and altitude responsive switching device comprising a spherical glass ampoule, a radioactive fluid which emits charged particles within said ampoule, said ampoule being permeable to said charged particles emitted by said radioactive fluid, a pair of substantially hemispherical collector electrodes bonded to the exterior of said sphere at diametrically opposed positions, the edges of said electrodes being spaced apart to provide an air gap therebetween, and an anode projecting into the interior of said ampoule through one of said electrodes and the adjacent wall of said ampoule, said anode being electrically insulated from said one of said electrodes.

3. A combined nuclear battery and altitude responsive switching device comprising a spherical glass ampoule, a quantity of krypton 85 contained within said ampoule, said ampoule being permeable to charged particles emitted by said krypton 85, a pair of substantially hemispherical copper collector electrodes bonded to the exterior of said ampoule at diametrically opposed positions, the edges of said electrodes being spaced apart to provide an air gap therebetween, and an electrically conductive anode projecting into the interior of said ampoule through one of said electrodes and the adjacent wall of said ampoule, said anode being electrically insulated from said one of said electrodes.

4. A combined nuclear battery and altitude responsive switching device comprising a spherical glass ampoule, a quantity of krypton 85 contained within said ampoule, the wall thickness of said ampoule being so selected that said ampoule is permeable to primary beta particles emitted by said krypton 85 while being impermeable to back scattered primaries and low energy secondaries, a pair of substantially hemispherical copper collector electrodes bonded to the exterior of said ampoule at diametrically opposed positions, the edges of said electrodes being spaced apart to provide an air gap along an equator of said ampoule, a boss formed on said ampoule projecting through the center of one of said electrodes, and an electrically conductive anode extending into the interior of said ampoule through the center of said boss and fused therein.

5. An altitude responsive switching device comprising a closed, hollow member of electrically insulating material, a radioactive fluid which emits charged particles contained within said hollow member, said hollow member being permeable to said charged particles emitted by said radioactive fluid, and a pair of electrodes substantially enclosing said hollow member and having interior configurations generally complementary to the exterior configuration of said hollow member, the edges of said electrodes being spaced apart to provide an air gap therebetween.

6. An altitude responsive switching device comprising a spherical member of electrically insulating material, a radioactive fluid which emits charged particles within said spherical member, said spherical member being permeable to said charged particles emitted by said radioactive fluid, and a pair of substantially hemispherical electrodes bonded to the exterior of said sphere at diametrically opposed positions, the edges of said electrodes being spaced apart to provide an air gap therebetween.

7. An altitude responsive switching device comprising a hollow glass sphere, a quantity of krypton 85 within said sphere, said sphere being permeable to charged particles emitted by said krypton 85, and a pair of substantially hemispherical copper electrodes bonded to the exterior of said sphere at diametrically opposed positions, the edges of said electrodes being spaced apart to provide an air gap along an equator of said sphere.

8. A combined nuclear battery and altitude responsive switching device comprising an ampoule of electrically insulating material, a radioactive fluid which emits charged particles contained within said ampoule, said ampoule being permeable to said charged particles emitted by said radioactive fluid, a pair of collector electrodes substantially enclosing said ampoule and having interior configurations generally complementary to the exterior shape of said ampoule, the edges of said electrodes being spaced apart to provide an air gap therebetween, and an anode projecting through the wall of said ampoule and into the interior thereof, said anode being electrically insulated from said electrodes.

References Cited by the Examiner
UNITED STATES PATENTS

| | | |
|---|---|---|
| 2,631,246 | 3/1953 | Christian. |
| 2,640,953 | 6/1953 | Rossi _____ 310—3 |
| 2,696,563 | 12/1954 | Coleman _____ 310—3 |
| 2,728,867 | 12/1955 | Wilson _____ 310—3 |
| 2,763,789 | 9/1956 | Ohmart _____ 250—83.6 |
| 2,763,790 | 9/1956 | Ohmart _____ 250—83.6 |
| 2,809,306 | 10/1957 | Coleman _____ 310—3 |
| 2,864,012 | 12/1958 | Thomas et al. _____ 310—3 |
| 2,900,535 | 8/1959 | Thomas _____ 310—3 |
| 3,069,571 | 12/1962 | Lieb et al. _____ 310—3 |

CHESTER L. JUSTUS, *Primary Examiner.*

LEWIS H. MYERS, FREDERICK M. STRADER,
*Examiners.*